May 30, 1933. H. WARING 1,912,328
DRYING AND/OR FILTRATION OF MIXTURES OF LIQUIDS AND SOLIDS
Filed June 5, 1931
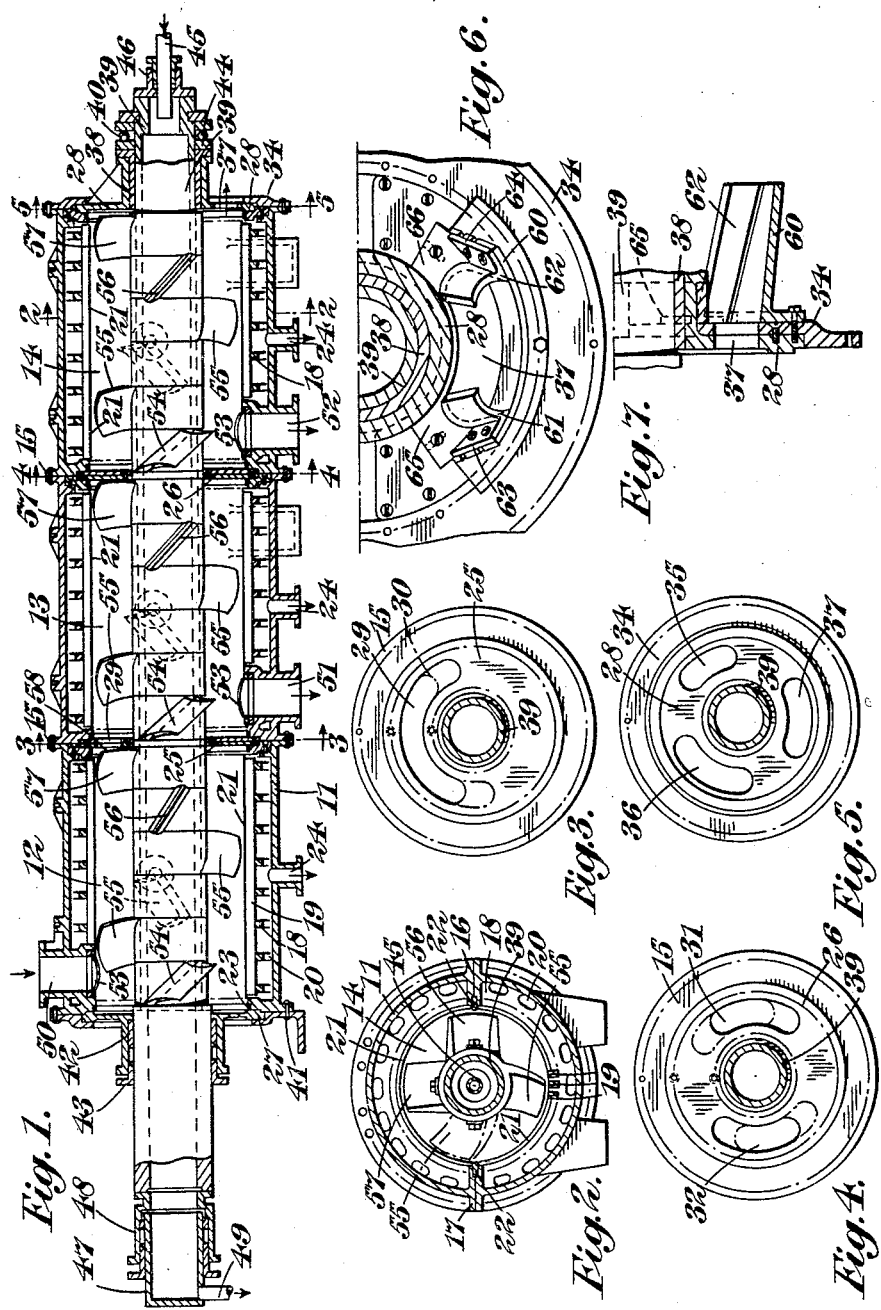
INVENTOR
Horace Waring;
By Whitson, Coit, Morse & Grindle
ATTYS Patented May 30, 1933

1,912,328

UNITED STATES PATENT OFFICE

HORACE WARING, OF LIVERPOOL, ENGLAND, ASSIGNOR TO GOODLASS WALL AND LEAD INDUSTRIES LIMITED, OF LONDON, ENGLAND, A BRITISH COMPANY

DRYING AND/OR FILTRATION OF MIXTURES OF LIQUIDS AND SOLIDS

Application filed June 5, 1931, Serial No. 542,447, and in Great Britain June 24, 1930.

This invention comprises improvements in or relating to the drying and/or filtration of mixtures of liquids and solids It is an object of the invention to provide means for filtering, drying or dewatering mixtures formed by admixture of finely divided materials with water, oil or other liquid, which are frequently extremely retentive of the liquid which they contain. Thus, for example, in the paint industry pigments are frequently mixed with water for grinding or other purposes and it becomes necessary subsequently to incorporate them with oil, for which purpose some or all of the water may need to be removed. Again, it may be desired to produce the pigment in dry form. The removal of water below a certain percentage in some cases offers considerable difficulty and the same applies in many other industries. Filtration to remove the water has been attempted and in particular it has been proposed to filter the material upon a cloth to the rear face of which suction is applied, and rotary filters of this type are in common use for the filtration of various mixtures. The difficulty which exists with filtration of this kind is that a partially dried cake forms upon the moving filtering medium, and as soon as the liquid content has fallen to a certain degree a steady state is set up under which further loss of liquid in the filter cake is very slow. I have found experimentally that in a rotatable suction filter the greatest loss of liquid in the filter cake occurs almost exclusively in the initial period of the filtering operation, soon after the cake has collected upon the filtering medium. I have found experimentally that in the later stages of such filtration a much greater rate of loss of liquid from the filter cake may be induced by subjecting the filter cake to constant or repeated disturbance, as, for example, by stirring with a knife blade or paddle.

According to the present invention a process of filtration is characterized by forming a filter cake of the material in contact with a filtering medium and subjecting the material of the filter cake to repeated rearrangement of its particles.

Preferably a pressure difference is set up between opposed sides of the filtering medium to assist the passage of the liquid phase of the material to be treated therethrough. The rearrangement of the particles of the filter cake may be effected by periodically sweeping over the filter cake a paddle or the like. Other means for effecting disturbance or rearrangement of the particles may, however, be used such for example as vibration of the filtering medium of such severity as will serve to rearrange the solid particles in the filter cake, or the employment of a steam or air jet.

The invention comprises a filtration apparatus having in combination a filtering medium (for example a filter cloth), means for maintaining a pressure difference between one side and the other of the filter cloth and a spreading paddle or similar device mounted for continuous repeated movement relative to the face of the filtering medium on the higher pressure side thereof in such manner as to spread a layer of material to be filtered upon the cloth and during subsequent movements thereover to rearrange the solid particles in the said layer.

Preferably the filtering medium is disposed upon the interior surface of a hollowed casing and the spreading paddle or paddles are mounted within the filtering medium to rotate co-axially therewith. The casing and filter cloth may completely surround the paddles or the like, for example may take the form of a hollow cylindrical drum. The casing or drum constitutes a vacuum chamber.

In one construction the paddles take the form of blades having surfaces inclined to the axis about which they are mounted for rotation for the purpose of propelling the filter cake through the surrounding casing.

The filtering medium may comprise a cloth nailed to a number of parallel closely spaced wooden slats set edgewise to the face of the cloth.

When the filtering medium constitutes the interior surface of a hollow casing or drum, the wooden slats may be supported in slots in internally projecting flange-rings from the casing. The tips of the paddles may rotate close to but out of contact with the filter cloth for example they may extend to within about 1/8" of the surface of the filter cloth.

The paddles may be mounted upon a hollow shaft for the reception of heating or cooling fluid.

The casing may be provided with one or more transverse diaphragms over which moves one edge of a paddle or paddles so inclined as to squeeze material undergoing filtration firmly against the diaphragm or diaphragms.

The diaphragms or diaphragm may be provided with openings for the passage of filtered material, and the arrangement may be such that the said openings are adjustable in size.

The following is a description by way of example of one form of filtration apparatus in accordance with the present invention:—

The apparatus is illustrated in the accompanying drawing in which—

Figure 1 is a longitudinal section through the apparatus.

Figure 2 is a cross-section upon the line 2—2 of Figure 1,

Figure 3 is a cross-section upon the line 3—3,

Figure 4 is a cross-section on the line 4—4,

Figure 5 is a cross-section upon the line 5—5, and

Figures 6 and 7 are details of an adjustable discharge chute.

Referring to Figures 1 and 2 the apparatus comprises a casing 11 in the form of a horizontal cylindrical drum which is divided transversely into three sections 12, 13, 14, united by flanges 15. The drum is moreover divided horizontally into an upper and a lower part which are united by flanges 16, 17 shown in Figure 2. Within the drum there are a number of circumferential flanges 18 which are cast as a portion of the particular section of the drum casing in which they are located. The flanges 18 are slotted at frequent intervals around their internal periphery with radial slots into which are wedged edgewise wooden slats 19. The flanges are provided with a large number of holes 20 at their base where they are united to the wall of the drum 11 to ensure that the annular space enclosed between the slats 19 and the wall of the drum is continuous throughout each section of the drum or casing. To the interior of the slats 19 there is nailed a filter cloth 21. The filter cloth 21 is in sections which correspond to the sections in which the casing is cast, that is to say each section of filter cloth covers only one half of the periphery of the drum and one third of its length, an arrangement which facilitates ready renewal of worn sections of the cloth. The longitudinal edges of the cloth are secured in the joints 16, 17 by driving them into gaps, cast in the interior edges of the joint, with wooden wedges 22. The circumferential edges of the filter cloths are secured beneath fastening rings 23 which fit in recesses cast in the ends of the sections of the drum. Each section of the drum is provided with a connection 24 to a vacuum pump, which draws away outflowing water as well as any air which passes through the filter cake on the filter cloth 21

The sections of the drum are subdivided by transverse diaphragms 25, 26 and they are closed by end plates 27, 28. The diaphragm 25, as shown in Figure 3, consists of two circular plates which fit together face to face and are each provided with an aperture 29 in their upper portion. By rotating one of the plates relatively to the other into the positions shown by the chain line 30 in Figure 3, the effective size of the aperture 29 may be diminished.

The diaphragm 26, shown in detail in Figure 4, is similar to the diaphragm 25 but is provided with two apertures 31, 32, one on each side of the axis, and here again the effective size of the apertures may be adjusted by rotating one of the two plates 26 relatively to the other.

The end plate 28 is held on to the end of the casing 11 by a ring-flange 34. The plate is provided with three discharge apertures 35, 36, 37 which are of different sizes from one another and by rotating the plate 28 any one of these apertures may be brought to the bottom, the aperture which is at the bottom acting as the effective discharge aperture for the final section of the drum.

The end plate 28, moreover contains a bearing 38 for a hollow cast iron shaft 39 which passes through the drum from end to end. The shaft 39 is held up against end thrust by a ball thrust race 40.

Returning to the inlet end of the drum the flange 27 is secured to the end of the drum by a surrounding ring-flange 41 and it carries a bearing 42 for the other end of the shaft 39. The bearing 42 is provided with a stuffing box 43, which is necessary at this end of the drum to shut off the interior of the drum from the external atmosphere in cases where it is desired to conduct the filtration with a super-atmospheric pressure inside the drum. No stuffing box is necessary at the bearing 38 inasmuch as a fluid-tight joint is secured by the flange 44 of the thrust bearing 40 which bears firmly against the end of the bearing 38. It is not possible to provide a flange at the bearing 42, however, at the other end of the drum, as longitudinal movement must be allowed for expansion of the shaft 39 under variation of temperature.

The shaft 39 is hollow and is provided with a steam inlet pipe 45 passing through a stuffing box 46 at one end and with an outlet pipe 47 passing through a stuffing box 48 at the other. The outlet connection 47 is made of internal diameter equal to the bore of the shaft 39 so as to permit drainage of any condensed steam which might otherwise collect in the walls of the shaft 39. From the outlet box 47 there depends an outflow pipe 49.

The casing 11 is provided with a flanged inlet pipe 50 at the inlet end for the admission of material to be filtered. In addition to the outlet 37 at the discharge end there are provided intermediate outlets 51, 52 at the beginning of each of the sections 13 and 14 of the drum. Thus it is possible to withdraw filtered material at any desired stage of the treatment. The outlets 51 and 52 are provided with discharge valves of the gate pattern which are not however shown in the drawing. The joint of the filter cloth 21 to the outlets 51, 52 and the inlet 50 comprises a wedging-ring 53 which is driven down upon the edges of the filter cloth around the outlet, or the inlet, as the case may be, and serves to wedge the filter cloth against the surrounding wall of the inlet or outlet.

Upon the shaft 39 there are located a number of skewed blades or paddles 54, 55, 56 and 57. The tips of the paddles extend almost into contact with the filter cloth 21, being spaced about ⅛" therefrom. The initial paddles 54, are inclined backwardly, viewed in an axial direction, as shown in Figure 2. There is one or more of these backwardly inclined paddles at the inlet end of each section of the drum and their purpose is to spread the material over the filter cloth and form it into a filter cake. The paddles being inclined to the axis of the drum, act also as conveyor blades and therefore they not only spread it into the form of a filter cake, and, in subsequent rotations serve to disturb and rearrange the particles of the cake, but also they advance the cake continuously towards the discharge outlet of the drum. The paddles 55 which immediately succeed the paddles 54 in each section are located at a somewhat less inclination to the axis than the initial paddles so that they do not tend to propel the material forward too fast, and they thus maintain it within the drum for a suitable period. The end paddles 57 not only serve the purposes just described but also their trailing edges 58 rotate but a short distance away from the diaphragms 25, 26 and the end plate 28. They consequently squeeze the material firmly against these diaphragms and end plate and it is found that in so doing a considerable additional amount of moisture is caused to escape from the material under the conditions prevailing in the filter. Not only so, these end paddles force the material through the apertures in the diaphragms and end plate and cause it to pass into the next section of the drum, or through the discharge opening 37 as the case may be.

Figures 6 and 7 show a modified construction of discharge opening in which the end plate 28 has secured upon it a discharge plate 60 upon which are mounted two deflector plates 61, 62. The discharge plate 60, with the deflector plates, constitutes a discharge chute and the width, (and therefore the capacity) of this chute may be varied by sliding the plates 61, 62 towards or from one another. The plates 61, 62 are to this end mounted on bases 63, 64 and provided with flanges 65, 66 which bear upon the discharge plate 60 and the end plate 28 respectively. The bases 63, 64 and the flanges 65, 66 are connected to the parts on which they lie by bolts which pass through slots in the bases and flanges, and by loosening the bolts the parts may be freed so that they can be slid towards or from one another. If this construction is adopted it is unnecessary to have openings of variable size in the end plate 28 as shown in Figure 5.

In the operation of this apparatus liquid containing solid matter in suspension is introduced at the inlet 50 and fills the first section of the drum up to the level of the discharge aperture 29 in the diaphragm 25. A filter cake tends to deposit on the filter cloth 21 as a result of vacuum maintained in the surrounding chamber, and if necessary also of pressure maintained in the interior of the drum. This filter cake is spread around the whole of the interior of the filter cloth by the paddles 54 and it is advanced and its particles repeatedly rearranged by the rotation of the paddles. The pulp is moreover warmed if necessary by the admission of steam to the interior of the shaft 39. A squeezing action takes place of the filter cake against the diaphragm 25 by the action of the trailing edge 58 of the paddle 57. By all these agencies the filter cake is partially freed of water in the first section of the drum. In the second section of the drum the partly dried filter cake which passes through the aperture 29 is again spread over the whole of the interior of the surface of the drum by the paddles, and there is in this drum no excess of water such as to maintain a high level of liquid in the drum. The outlets to the sections 31, 32 are therefore no longer at the top, above the axis of the shaft 39, as in the case of the diaphragm 25. If desired partially dewatered material may be drawn off from this section of the drum at 51. If it is desired, however, further to remove moisture from the material under treatment, it is caused to pass through the apertures 31, 32 into the third section 14 of the apparatus, and here it is resubmitted to spreading and repeated rearrangement of the particles as before. Consequently a nearly dry product can be drawn out through the opening 37, or a less dry product through the opening 52.

In some cases where plenty of steam heat is applied to the material and it is of an easily dewatered character evaporation, which takes place due to the heat within the drum, so assists the action of the filtering medium that the product through the aperture 37 may be quite dry and powdery. In other cases it may consist of nearly hard filter cake.

The material to be treated is preferably introduced in the form of a fairly thick pulp which is capable of being spread like mortar to form a filter-cake on the interior surface of the cloth. Devices for dewatering pulp to such a consistency are common and present no particular difficulty. It is the last stages of the removal of liquid which are difficult and which the present invention is desired to facilitate.

If, however, the apparatus is worked in an inclined or vertical position it is possible to introduce a suspension of solid in liquid at the bottom, so that rapid filtration takes place at the bottom yielding a filter cake immediately in contact with the filter cloth and thereafter to advance this stiffened layer or cake upwardly through the apparatus by the action of the paddles.

While one particular form of apparatus for carrying this invention into effect has been herein described, it is to be understood that the invention is not limited to application in this form of apparatus. Various modifications which may be introduced include the following:—

The filter cloth instead of being located in the form of a complete circle around the shaft carrying the paddles may be restricted to the lower half only so that the apparatus takes the form of a trough. In another modification the inlet to the treatment chamber may be in the centre, with outlets at both ends. Again the filter cloth may be disposed in a conical formation around the shaft. In certain circumstances the filter cloth might be rotated. The rearrangement of the particles may be assisted by some device for bringing about vibration, as for example by tapping the drum by means of cam-operated hammers.

A matter of prime importance in connection with this piece of apparatus appears to be the application of shearing forces to the filter cake which have the effect of liberating water therefrom so that the water is readily drawn through the filtering medium. The effect of the paddles is not merely to exert pressure on the pulp but to rearrange the particles by the action of the shearing forces.

It will also be clear that the paddles may be varied in speed and inclination to suit different types of material and that the best speed of rotation, and of feeding of the material to the machine may conveniently be determined in any particular case with a given machine by a simple experimental trial.

I claim:—

1. Filtering apparatus comprising in combination a casing, internally projecting flanges from the casing walls, radial slots in said flanges, slats set in said radial slots, a filter cloth secured to said slats, a co-axial shaft within the casing and inclined spreading and propelling paddles mounted upon the shaft so that they rotate with the tips of the paddles close to but out of contact with the filter cloth.

2. Filtering apparatus as claimed in claim 1, wherein the paddles are mounted upon a hollow shaft for the reception of temperature-modifying fluid.

3. Filtering apparatus as claimed in claim 1, wherein the paddles are so disposed as to sweep over the whole of the interior surface of the filtering medium.

4. Filtering apparatus as claimed in claim 1, wherein the paddles near the inlet end of the apparatus are less inclined to the axis about which they rotate than are the remainder of the paddles.

5. Filtering apparatus as claimed in claim 1, wherein the casing is provided with a transverse diaphragm over which moves one side edge of a paddle so inclined as to squeeze material undergoing filtration firmly against the diaphragm.

6. Filtering apparatus as claimed in claim 1, wherein the casing is provided with a diaphragm, one of the paddles is so located that its side edge sweeps over the face of the diaphragm and squeezes solid material of the filter cake against the same and the diaphragm is provided with an outlet opening for the passage of said material.

7. Filtering apparatus as claimed in claim 1, wherein the casing is longitudinally divided and the filtering medium is similarly divided into parts allocated to the corresponding parts of the casing.

8. A filtration apparatus comprising, in combination, a hollow casing, a filtration medium which is supported on the inside of the casing, but spaced therefrom, and which comprises a cloth and supporting means therefor, the latter comprising internally projecting flange rings from the casing having radial slots, wooden slats supported in the slots edgewise to the cloth and means for securing the cloth to the slats, a shaft extending through the casing and carrying paddles of such length as to rotate close to, but not in contact with the filtering medium, means to feed liquid containing solid material in suspension to the casing within the filtering medium means to withdraw filtered liquid in the casing outside the filtering medium, and means permitting discharge of solid material from within the filtering medium in the casing.

9. Filtering apparatus comprising in combination, a casing, internally projecting flanges from the casing walls, radial slots in said flanges, slats set in said radial slots, a filter cloth secured to said slats, a co-axial shaft within the casing and inclined spreading and propelling paddles mounted upon the shaft so that they rotate with the tips of the paddles close to but out of contact with the filter cloth, transverse diaphragms for closing the casing at the ends and sub-dividing it into sections, and apertures in said diaphragms such as to determine the depth of paste or liquid material treated in each section.

In testimony whereof I affix my signature.

HORACE WARING.